United States Patent [19]

Rector

[11] Patent Number: 4,862,423
[45] Date of Patent: Aug. 29, 1989

[54] SYSTEM FOR REDUCING DRILL STRING MULTIPLES IN FIELD SIGNALS

[75] Inventor: James W. Rector, Menlo Park, Calif.

[73] Assignee: Western Atlas International, Inc., Houston, Tex.

[21] Appl. No.: 213,640

[22] Filed: Jun. 30, 1988

[51] Int. Cl.$^4$ ............................................. G01V 1/00
[52] U.S. Cl. ...................................... 367/25; 367/38; 367/40; 181/108; 175/40
[58] Field of Search ...................... 367/25, 38, 40, 41, 367/43, 50, 55; 181/102, 108, 106; 340/853; 73/152; 175/40, 50

[56] References Cited

U.S. PATENT DOCUMENTS

| | | | |
|---|---|---|---|
| 3,881,168 | 4/1975 | Farr et al. | 175/50 |
| 4,391,135 | 7/1983 | Godbey et al. | 367/108 |
| 4,460,059 | 7/1984 | Katz | 175/40 |
| 4,718,048 | 1/1988 | Staron et al. | 367/40 |

FOREIGN PATENT DOCUMENTS

0273722A2  6/1988  European Pat. Off. .

*Primary Examiner*—Deborah L. Kyle
*Assistant Examiner*—J. Woodrow Eldred
*Attorney, Agent, or Firm*—E. Eugene Thigpen

[57] ABSTRACT

The invention comprises a method of geophysical exploration wherein a signal is generated at the lower end of a drill string and propagates into the earth and up said drill string. The signal is detected at the top of said drill string and at other locations substantially at the earth's surface. The signal detected at the top of the drill string is utilized to develop an operator to reduce the magnitude of drill string multiples in the signal detected by the field sensors.

20 Claims, 2 Drawing Sheets

SYSTEM FOR REDUCING DRILL STRING MULTIPLES IN FIELD SIGNALS

BACKGROUND OF THE INVENTION

1. Field of the Invention

The present invention relates to geophysical seismic exploration wherein an acoustic source is deployed in a wellbore. More particularly, it relates to processing of signals resulting from such an acoustic source.

2. Description of the Prior Art

The use of an energy source positioned within a wellbore to generate a seismic signal for vertical seismic profiling is known. Use of the acoustic signal generated by rotation of the drill bit has also been proposed. In such method, a reference sensor is positioned on the drilling rig. Seismic vibrations from the drill bit are mechanically transmitted through the drill collars and through the drill pipe to the top of the kelly and into the swivel. A reference signal recorded on the rig at the top of the drill string corresponds to the bit generated signal modified by the transfer function between the bit and the reference sensor. The signal detected by the reference sensor is cross-correlated with the signals detected by field sensors to determine the travel times of signals transmitted through the earth and reflected from subsurface interfaces. It is known to flatten the source spectrum and, hence, the cross-correlation function spectrum, by deriving a filter based on the reference signal and convolving that filter response with the cross-correlation of the reference and field signals or with the reference signal prior to cross-correlation. Reference deconvolution causes the resulting wavelet to be sharper, which improves spatial and temporal resolution. It is also known that reference deconvolution attenuates multipath signals, which may be referred to as drill string multiples, in the reference signal. Drill string multiples are signals which have been reflected from locations in the drill string and, therefore, have traveled along at least a portion of the drill string a multiple number of times. However, drill string multiples are still present in the field signals and, consequently, will still be present in the cross-correlation function between the field signal and reference signal. The drill string multiples present in the field signal result primarily from signals reflected from the top of the drill string which then travel back down the drill string and propagate from the lower end thereof into the earth, and signals which are reflected downwardly from the interface between the drill collars and drill pipe and are then propagated into the earth. It is known to remove the long period drill string multiples (those reflected from the top of the drill string) by utilizing a series of cross-correlation functions between the field and reference signals at different borehole depths and applying a multitrace rejection filter around an apparent velocity equal to half the velocity of propagation within the drill string. The short period multiples (those reflected downwardly from the interface between the drill pipe and drill collars), however, will still be present in the field signal. It is an object of this invention to attenuate these short period multiples.

SUMMARY OF THE INVENTION

The invention comprises a method of geophysical exploration wherein a signal is generated at the lower end of a drill string and propagates into the earth and up said drill string. The signal is detected at the top of said drill string and at other locations substantially at the earth's surface. The signal detected at the top of the drill string is utilized to develop an operator to reduce the magnitude of drill string multiples in the signal detected by the field sensors.

In a preferred embodiment, the signal is generated by rotation of the drill bit and the operator is developed for reducing drill string multiples resulting from reflections between the interface between the drill collars and drill pipe and the lower end of the drill string.

DESCRIPTION OF THE PREFERRED EMBODIMENT

Figure 1:
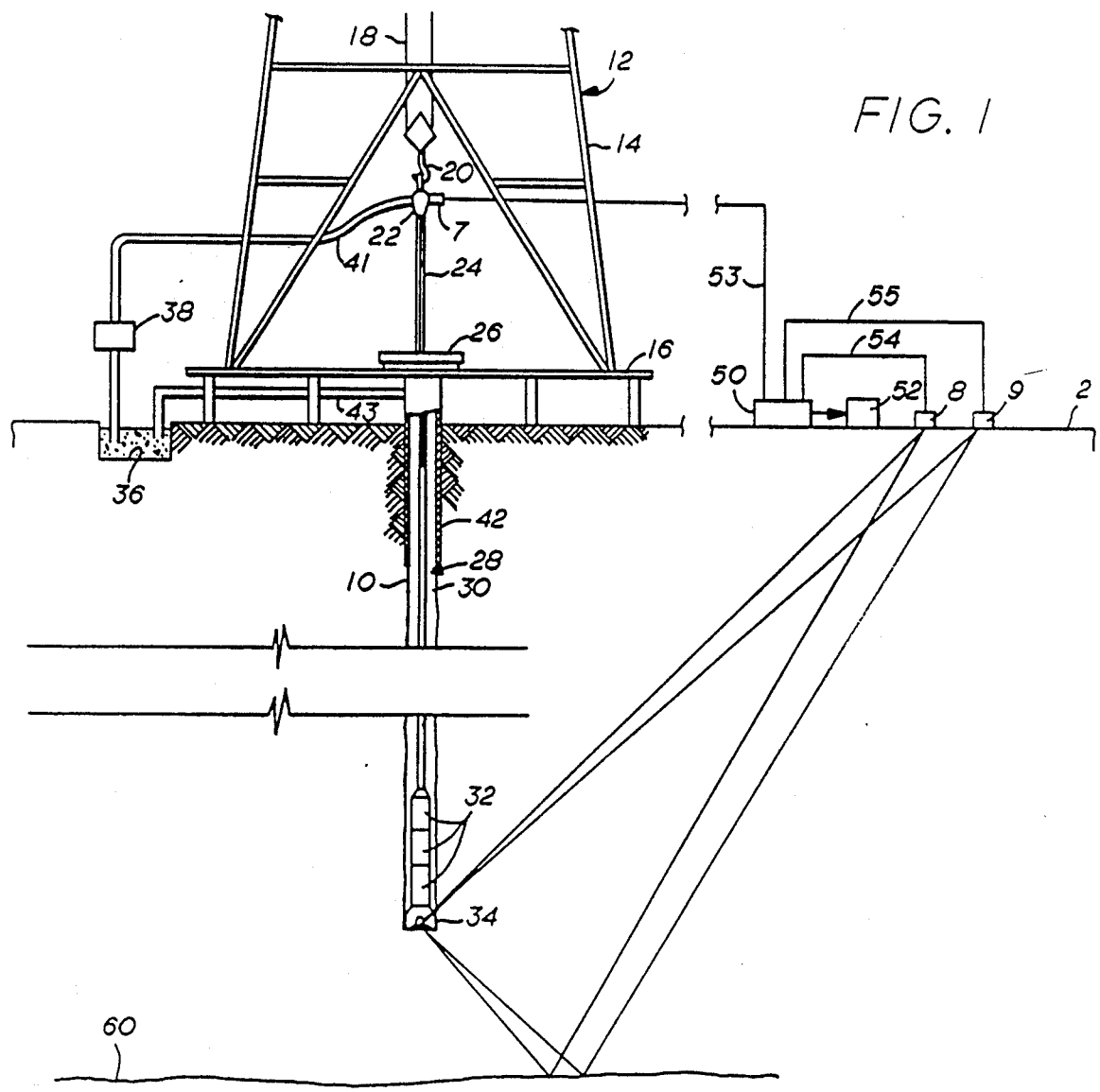
FIG. 1 shows a drilling operation utilizing a preferred embodiment of the invention.

FIG. 1 shows a well 10 being drilled in the earth with a rotary drilling rig 12. The drilling rig includes the usual derrick 14, derrick floor 16, draw works 18, hook 20, swivel 22, kelly joint 24, rotary table 26, and a drill string 28 made up of drill pipe 30 secured to the lower end of a kelly joint 24 and to the upper end of a section of drill collars 32, which carry a drill bit 34. Drilling fluid circulates from a mud pit 36 through a mud pump 38 and a mud supply line 41 and into the swivel 22. The drilling mud flows down through the kelly joint, drill string and drill collars, and through nozzles (not shown) in the lower face of the drill bit. The drilling mud flows back up through an annular space 42 between the outer diameter of the drill string and the well bore to the surface, where it is returned to the mud pit through a mud return line 43.

A reference sensor 7 is mounted on the upper portion of the drill string 28. In a particular preferred embodiment, reference sensor 7 is mounted on swivel 22. Normally, a plurality of field sensors, such as geophones 8 and 9, are located at the earth's surface 2 at suitable locations. The sensor 7 and the geophones 8 and 9 are connected by means of conductors 53–55 or by telemetering to an amplifier 50 connected to a recorder 52. In a preferred embodiment sensor 7 may be an accelerometer.

The impact of the bit 34 on the rock at the bottom of the borehole 10 generates elastic waves which propagate vertically upward through the drill string, and radially outward into the earth formation. The drill string path has little attenuation of acoustic energy by virtue of its steel composition and, therefore, the signal received by the sensor 7 is representative of the vibrations emitted by the drill bit 34 into the earth formation. Signals emitted into the earth will travel upwardly to the field sensors and will also be reflected from subsurface interfaces, such as interface 60 beneath the drill bit, back to the field sensors. Normally, the transmission time of seismic energy from the drill bit to the field sensors is determined from cross-correlation of the signal detected by the sensor 7 with the signals detected by the field sensors.

Because at least a portion of the acoustic signal will be reflected from discontinuities in the drill string and from locations where there is a change in diameter of the drill string (primarily the interface between the drill collars and drill pipe), the signal detected at the top of the drill string will include not only the primary signal emanating from the drill bit but also drill string multiples resulting from reflections of the primary signal from the drill collar - drill pipe interface and the top and bottom of the drill string. Acoustic energy resulting from such drill string multiples is also emitted from the drill bit into the earth. Such reflected energy travels to the field sensor from the drill bit along with the primary energy emitted by the drill bit.

Figure 2:
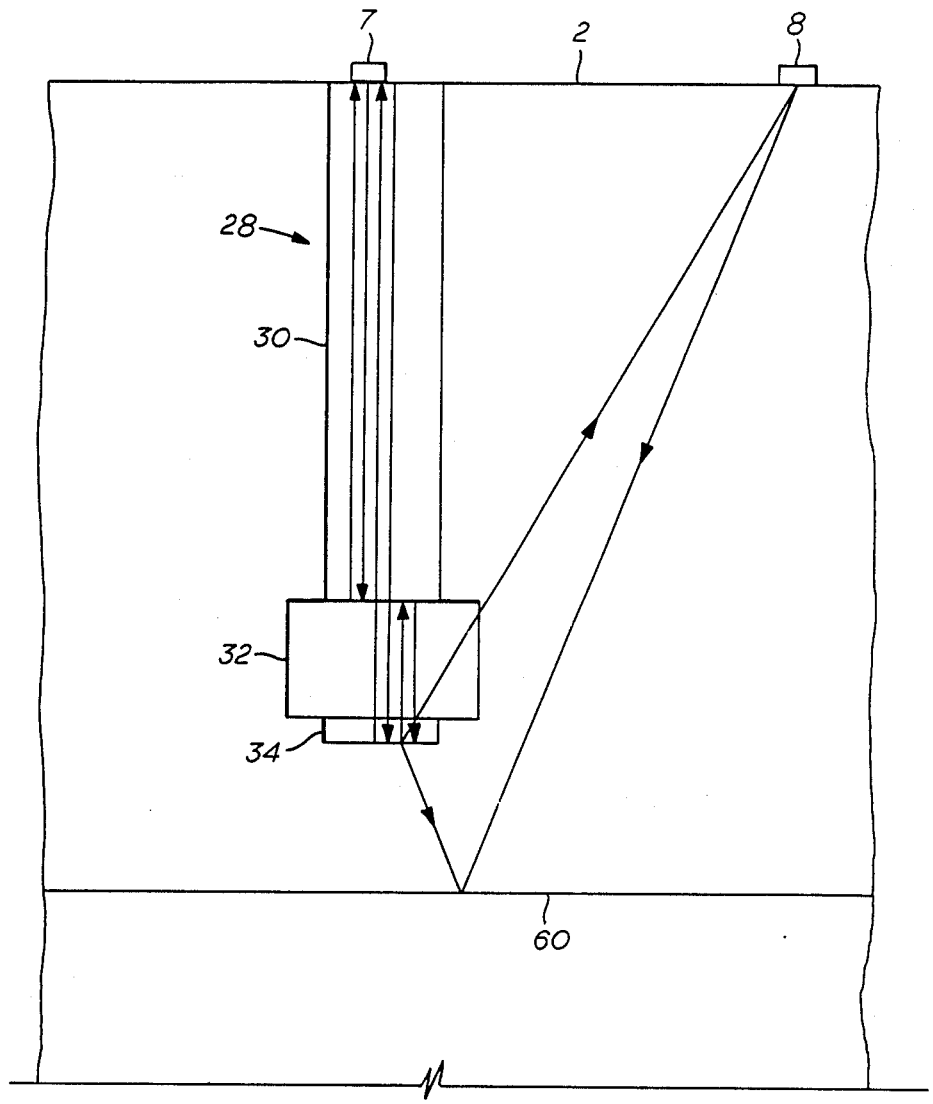
FIG. 2 shows the travel paths of seismic signals generated by a drill bit at the bottom of a wellbore.

FIG. 2 illustrates the reflections of acoustic energy from the top and bottom of the drill string 28 and from the interface 62 between the drill collars 32 and drill pipe 30. FIG. 2 also illustrates possible travel paths of seismic energy from the drill bit 34 to a field geophone 8.

The acoustic signal travels up from the drill bit to the drill collar - drill pipe interface where a portion of the energy is reflected and a portion is transmitted and travels to the top of the drill string. When the reflected portion reaches the bottom of the drill string, a portion of the reflected energy emanates into the earth and a portion is reflected upwardly. When the reflected energy again reaches the interface between the drill collars and drill pipe, a portion thereof is re-reflected, and so on, so that a short period drill string multiple having a period related to the travel-time between the drill bit and the drill collar - drill pipe interface emanates from the bottom of the drill string. Because a portion of the short period multiple is transmitted through the drill collar - drill pipe interface, this short period muitiple is detectable at the top of the drill string.

The following equation represents in transform notation the short period signal time series emanating from the lower end of the drill bit which is detected by the field geophone.

$$GEO(Z) = SOURCE(Z)[p + (1-p)rpZ^{2BHA} + \ldots]EARTH(Z)$$

p = fractional portion of energy at the bottom of the drill string which is radiated into the earth r = fractional portion of upward traveling energy which is reflected downwardly at the drill pipe - drill collar interface BHA = one-way travel time between the bottom of the drill string and the drill collar-drill pipe interface.

The multiple sequence enclosed in brackets may be represented as BHAMULT(Z) so that the geophone signal may be written as the convolution of a source signal with the impulse response of the bottom bole assembly and the impulse response of the earth. In Z transform notation $$GEO(Z) = SOURCE(Z) \ BHAMULT(Z) \ EARTH(Z)$$

The signal detected by sensor 7 at the top of the drill string is referred to as the pilot (or reference) signal. The time series for the short period energy which reaches the top of the drill string may be written in Z transform notation as:

$$PILOT(Z) = SOURCE(Z)[(1-p)(1-r)Z^{BHA} + (1-p)(1-r)(1-p)rZ^{3BHA} + \ldots] DPIPE(Z)$$

where
p = fractional portion of energy at the bottom of the drill string which is radiated into the earth r = fractional portion of upward traveling energy which is reflected downwardly at the drill pipe- drill collar interface BHA = one-way travel time between the bottom of the drill string and the drill collar drill pipe interface.

Note that, except for an amplitude factor, and a delay factor, $Z^{BHA}$, the bracketed term is exactly equivalent to the bracketed term for the geophone signal. Therefore, the pilot signal can be used to derive an operator to attenuate the short period drill string multiple in the field signal. The time series can also be represented by the convolution $$PILOT(Z) = SOURCE(Z) \ BHAMULT(Z) \ DPIPE(Z)$$

In addition to the short period multiples, there will also be present in the pilot signal and field geophone signal, longer period multiples resulting from reflections from the top of the drill string. At the lower end of the drill string, a portion of the reflected energy is emitted into the earth and a portion is re-reflected (either from the bottom of the drill string or from the drill pipe - drill collar interface) and travels back to the top of the drill string. However, the longer period multiples detected at the field geophones will have different characteristics from the long period multiples detected in the pilot signal at the top of the drill string. These characteristics do not allow the pilot signal to be used to derive a deconvolution operator for the long period multiples in the field geophone signal.

If long period multiple energy in the pilot signal is excluded, the term DPIPE(Z) is a pure delay filter, and the pilot signal convolution equation may be written as $$PILOT(Z) = Z^{\gamma} SOURCE(Z) \ BHAMULT(Z)$$

where $\gamma$ = travel time for energy to travel from the bottom of the drill pipe to the pilot sensor at the top of the drill string.

The autocorrelation of the pilot signal may be written in Z transform notation as $$PILOT \ (1/Z) \ PILOT(Z)$$

The autocorrelation function for short period multiple energy may also be written as:

$$Z^{-\gamma} \ SOURCE \ (1/Z) \ BHAMULT(1/Z) \ Z^{\gamma} \\ SOURCE(Z) \ BHAMULT(Z)$$

which reduces to:

$$SOURCE(1/Z) \ BHAMULT(1/Z) \ SOURCE(Z) \\ BHAMULT(Z)$$

To generate the autocorrelation function which excludes the long period acoustic energy, the pilot signal is windowed to exclude delays equal to or greater than the two way travel time between the top of the drill string and the drill pipe-drill collar interface.

An operator is generated from this windowed autocorrelation function, which when convolved with the field geophone signal, attenuates the short period multiple reflection in the field geophone signal. The operator, which may be the minimum phase inverse of the pilot signal may be derived using wavelet compression techniques known to those of ordinary skill in the art.

This operator may be expressed as:

$$OP(Z) = \frac{1}{\text{SOURCE}(Z)\ \text{BHAMULT}(Z)}$$

When this operator is applied to the geophone signal to the EARTH(Z) response is obtained:

$$OP(Z)\ GEO(Z) = \frac{\text{SOURCE}(Z)\ \text{BHAMULT}(Z)\ \text{EARTH}(Z)}{\text{SOURCE}(Z)\ \text{BHAMULT}(Z)}$$
$$= \text{EARTH}(Z)$$

By convolving the derived operator with the geophone signal, the magnitude of the short period multiples in the geophone signal is attenuated.

When the drill bit is utilized as the energy source, the field signal is normally cross-correlated with the pilot signal. Typically, the cross-correlation of the field signal and the pilot signal will be performed and the operator is then convolved with the cross-correlation function. The operator may, however, be convolved with the field signal prior to cross-correlation of the field signal with the pilot signal.

Although the preferred embodiment has been described in terms of using the energy emitted from the drill bit as the seismic source, it is understood that other sources positioned at the lower end of the drill string may be utilized. Such sources may be of any suitable type for producing vibrations, impulses, implosions, explosions, or sudden injections of fluid against the walls of the wellbore.

Various changes in the details of the invention as described herein may be apparent to those skilled in the art. It is intended that such changes be included within the scope of the claims appended hereto.

I claim:

1. A method of geophysical exploration comprising:
   generating energy at substantially the lower end of a drill string utilized for drilling a borehole into the earth, said energy being imparted into the earth as seismic wave energy from said lower end of said drill string and imparted upwardly as acoustic wave energy through the drill string and at least a portion of said acoustic wave energy imparted upwardly through said drill string being reflected downwardly from at least a first location below the top of said drill string and imparted into the earth as seismic energy at the lower end of said drill string;
   detecting said acoustic wave energy at substantially the upper end of said drill string to generate a pilot signal;
   detecting said acoustic wave energy at least one field location substantially at the earth's surface to generate a field signal; and
   utilizing said detected pilot signal to develop an operator for reducing the magnitude in said field signal of said energy reflected downwardly from said first location below the top of said drill string.

2. The method of claim 1 wherein said drill string comprises a drill bit at the lower end of said drill string, at least one drill collar above said drill bit and drill pipe extending from said at least one drill collar to substantially the earth's surface and said first location is the interface between said drill pipe and said at least one drill collar.

3. The method of claim 2 wherein said energy generated at the lower end of said drill string is generated by said drill bit.

4. The method of claim 1 wherein said operator comprises the minimum phase inverse of the pilot signal, said minimum phase inverse being derived from the pilot signal auto-correlation function.

5. The method of claim 4 further comprising convolving said operator with said field signal.

6. The method of claim 5 further comprising cross-correlating said pilot signal with said field signal prior to convolving said operator.

7. The method of claim 4 wherein said pilot signal and said field signal each include a short period drill string multiple resulting from reflections between said first location and the lower end of said drill string and longer period drill string multiples, said method further comprising windowing said auto-correlation function to exclude from said operator said longer period drill string multiples.

8. The method of claim 7 wherein the generation of the operator comprises windowing said auto-correlation function to exclude drill string multiple resulting from reflections between substantially the upper end of said drill string and the interface between the drill pipe and drill collar.

9. The method of claim 8 further comprising convolving said operator with said field signal.

10. A method of geophysical exploration wherein energy is generated at the lower end of a drill string utilized for drilling a borehole into the earth, said energy being imparted into the earth as seismic wave energy from the lower end of said drill string and imparted upwardly through the drill string as acoustic wave energy and wherein drill string multiples resulting from energy reflections within said drill string propagate as acoustic wave energy within said drill string and are imparted into the earth as seismic waves energy form the lower end of said drill string, comprising:
   detecting said acoustic wave energy at substantially the upper end of said drill string to generate a pilot signal;
   detecting said seismic wave energy at least one location substantially at the earth's surface to generate a field signal;
   utilizing said detected pilot signal to develop an operator for attenuating the magnitude in said field signal of a drill string multiple resulting from downward reflections of energy from a first location below the top of said drill string.

11. The method of claim 10 wherein said drill string comprises a drill bit at the lower end of said drill string, at least one drill collar above said drill bit and drill pipe extending from said drill collar to substantially the earth's surface and said first location is the interface between said drill collar and said drill pipe.

12. The method of claim 11 wherein said energy generated at the lower end of said drill string is generated by said drill bit.

13. The method of claim 12 wherein said drill string multiple resulting from downward reflections of energy from said first location is reflected between said first location and the lower end of said drill string.

14. The method of claim 10 wherein said operator comprises the minimum phase inverse of the pilot signal, said minimum phase inverse being derived from the pilot signal auto-correlation function.

15. The method of claim 14 further comprising convolving said operator with said field signal.

16. The method of claim 15 further comprising cross-correlating said pilot signal with said field signal prior to convolving said operator.

17. The method of claim 14 wherein said pilot signal and said field signal each include a short period drill string multiple resulting from reflections between said first location and the lower end of said drill string and longer period drill string multiples, said method further comprising windowing said auto-correlation function to exclude from said operator said longer period drill string multiples.

18. The method of claim 17 wherein the generation of the operator comprises windowing said auto-correlation function to exclude drill string multiples resulting from reflections between substantially the upper end of said drill string and the interface between the drill pipe and drill collar.

19. The method of claim 18 further comprising convolving said operator with said field signal.

20. A method of geophysical exploration comprising:
generating an acoustic signal at substantially the lower end of a drill string for drilling a borehole into the earth, said acoustical signal propagating into the earth from said lower end of said drill string and upwardly through said drill string, said drill string comprising a drill bit at the lower end of said drill string, at least one drill collar above said drill bit, and drill pipe extending from said at least one drill collar to substantially the earth's surface, at least a portion of said acoustic energy being reflected downwardly within said drill string from the interface between said drill collar and drill pipe and from substantially the top of said drill string and at least a portion of said downwardly reflected energy being reflected upwardly from substantially the bottom of said drill string and from the interface between said drill pipe and said drill collar thereby generating drill string multiple reflections, comprising:
detecting said acoustic signal at substantially the upper end of said drill string to generate a pilot signal;
detecting said seismic signal at at least one field location substantially at the earth's surface to generate a field signal; and
utilizing the pilot signal to generate an operator for application to said field signal to reduce the magnitude of drill string multiples resulting from downward reflections of the acoustic signal from the interface between the drill collar and drill pipe.

* * * * *